United States Patent [19]
Castellucci

[11] Patent Number: 6,147,182
[45] Date of Patent: Nov. 14, 2000

[54] CURABLE LIQUID HYDROXYL-TERMINATED EPOXY POLYETHER POLYMERS

[75] Inventor: Nicholas Castellucci, Lomita, Calif.

[73] Assignee: Northrop Grumman Corporation, Los Angeles, Calif.

[21] Appl. No.: 09/238,677

[22] Filed: Jan. 26, 1999

Related U.S. Application Data

[62] Division of application No. 08/933,910, Sep. 29, 1997, Pat. No. 5,880,249.
[51] Int. Cl.$^7$ .............................. C08G 59/18; C08G 59/14
[52] U.S. Cl. .......................... 528/271; 528/403; 528/421; 528/425
[58] Field of Search ..................................... 528/486, 491, 528/217, 480, 271, 403, 421, 425

[56] References Cited

U.S. PATENT DOCUMENTS

| | | | |
|---|---|---|---|
| 3,954,882 | 5/1976 | Kalopissis et al. | 424/70 |
| 5,525,262 | 6/1996 | Castellucci et al. | 252/514 |
| 5,621,062 | 4/1997 | Castellucci et al. | 528/30 |

*Primary Examiner*—Jeffrey C. Mullis
*Attorney, Agent, or Firm*—Terry J. Anderson; Karl J. Hoch, Jr.

[57] ABSTRACT

A novel process for producing novel curable, liquid, hydroxyl-terminated epoxy polyether polymers by the direct polymerization of vinyl epoxy ether monomers in the presence of a strong alkali, to form a hydroxyl-terminated vinyl polyether polymer, followed by the epoxidation of the vinyl groups to form a novel curable, liquid hydroxyl-terminated epoxy polyether polymer which is stable against unintended polymerization in view of the epoxidation of the vinyl groups and is rapidly curable with the addition of conventional multifunctional curing agents.

2 Claims, No Drawings

CURABLE LIQUID HYDROXYL-TERMINATED EPOXY POLYETHER POLYMERS

This application is a divisional of application application Ser. No. 08/933,910 filed on Sep. 29, 1997 now U.S. Pat. No. 5,880,249.

BACKGROUND OF THE INVENTION

1. Field of the Invention

The present invention relates to the preparation of novel liquid epoxy polyether polymers which do not require the presence of organic solvents and which are rapidly curable with conventional multifunctional curing agents, such as amines, to produce environmentally-stable, flexible gap-fill or caulking materials, composites, paints and/or protective surface coatings.

2. State of the Known Art

Curable epoxy polyether polymers are well known coating, gap fill and/or caulking materials, and reference is made to U.S. Pat. Nos. 4,786,667 and 4,960,844 for their disclosure of such polymers. However, most such polymers are UV-sensitive, brittle at low temperatures, difficult to pigment, susceptible to rain-erosion and/or require the use of organic solvents which contain total toxic organics (TTO), volatile organic compounds (VOC) or chlorofluorocarbons (CFC).

It is known to produce polymers, including polyether polymers, from olefinic epoxy monomers, and reference is made to U.S. Pat. No. 4,647,642 which reacts 1-allyloxy-2, 3-epoxypropane with a polyphenol in the presence of a strong alkali to form an allyloxy-terminated polyphenol derivative, and then copolymerizes it with a polysiloxane.

It is desirable to provide a liquid epoxy polyether polymer which requires no solvent, can be made water-soluble and electrodepositable, is receptive to pigments and stable to UV, and is rapidly-curable with conventional multifunctional curing agents such as di-,tri-,tetra-functional, etc., to produce a pigments and stable to UV, and is rapidly-curable with conventional multifunctional curing agents such as di-,tri-,tetra-functional, etc., to produce a stable flexible protective coating, paint, adhesive, composite or caulk composition.

SUMMARY OF THE INVENTION

The present invention relates to a novel process for producing curable, liquid, hydroxyl-terminated epoxy polyether polymers by the direct polymerization of vinyl epoxy ether monomers in the presence of a strong alkali, to form a hydroxyl-terminated vinyl polyether polymer, followed by the epoxidation of the vinyl groups to form a curable, liquid hydroxyl-terminated epoxy polyether polymer which is stable against unintended polymerization, in view of the epoxidation of the vinyl groups. The formed liquid polymer is rapidly curable with the addition of conventional multifunctional curing agents, such as primary, secondary or tertiary amines, or phosphines (:PH$_3$, :PH$_2$R, :PHR$_2$, etc.), to produce environmentally-stable flexible elastomeric polymers in the form of coatings, adhesives, composites caulks and similar compositions.

DETAILED DESCRIPTION

The present method for producing stable, flexible rapidly-curable hydroxyl-terminated epoxy polyether elastomers is a two-step method in which (a) a liquid allyl ether epoxy alkane monomer, preferably 1-allyloxy-2,3-epoxypropane or allyl glycidyl ether, is polymerized in the presence of a strong alkali, followed by (b) the epoxidation of the terminal double bonds to produce a stable, curable liquid hydroxy-terminated epoxy alkane polyether (HTEPE) elastomer which is rapidly curable with conventional curing agents to form a stable, flexible coating, composite or caulk composition. The step of polymerizing the vinyl ether epoxy monomer, i.e.,

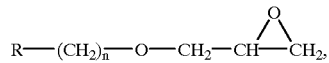

in which n is an integer from 1 to 10, may be carried out according to the following example.

EXAMPLE 1

A mixture of 1-allyloxy-2,3-epoxypropane (25.0 g, 220.0 mmol) and powdered potassium hydroxide (3.0 g) was stirred at 24° C. under argon for forty eight hours. The mixture was dissolved in benzene and then washed with water, dilute sulfuric acid, saturated sodium bicarbonate solution and finally with water until neutral. The benzene extract was concentrated in vacuo and the residue was dried further in high vacuum to give hydroxy terminated poly (allyloxy-propane) or hydroxy terminated poly (diglycidyl ether), referred to as HTPDGE. as a rubbery polymeric product (20.2 g), as verified by HNMR and IR spectra.

To prevent the polymerization of the terminal double bond of the hydroxy terminated poly(allyloxy-propane), the product was immediately epoxydized according to the following example.

EXAMPLE 2

To A stirred solution of meta-chloroperbenzoic acid (20.0 g, 116.0 mmol) in dry chloroform (30 ml) was added a solution of hydroxy terminated poly(allyloxy-propane) product (11.6 g, 101.3 mmol) in dry chloroform (60 ml) at 0° C. (ice-bath) over the period of thirty minutes under argon. The reaction mixture was stirred at room temperature overnight. After twenty hours of reaction, the mixture was washed with 10% sodium bicarbonate solution and dried over anhydrous sodium sulfate, filtered and the filtrate was concentrated in vacuo to give the epoxidized product (15.1 g). The proton NMR spectrum of the product showed the presence of epoxidized product including some unreacted double bond.

The direct anionic polymerization of 1-allyloxy-2,3-epoxypropane in the presence of potassium hydroxide, followed by epoxidation of the terminal double bond to give the stable hydroxy terminated epoxypolyether (HTEPE) is illustrated as follows:

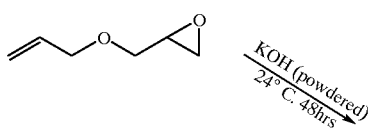

-continued

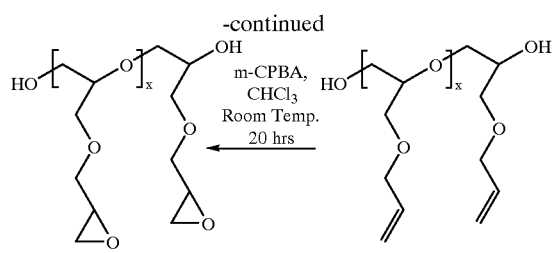

The preferred vinyl ether epoxy monomer for use according to the present invention is the allyl ether, i.e., where n=1, sometimes referred to as the 1-propenyl ether, but the higher alkenyl liquid 1-alkenyl ethers in which n=2 to 10, such as the 1-butenyl ether, the 1-pentenyl ether and the 1-hexenyl ether have reactivities similar to the allyl ether monomers are also suitable for the formation of the present hydroxyl-terminated epoxy polyether polymers in which x is a number greater than five.

The polymerization of the liquid vinyl ether epoxy monomer is carried out in the presence of a strong base which is soluble in the liquid monomer and which is separable from the formed polymer. Potassium hydroxide is the most preferred in these respects since it is soluble in the monomer, insoluble in the formed polymer and can be washed therefrom by means of water. Sodium hydroxide is also suitable, as are other known strong bases.

The second reaction according to the present process involves the oxidation of the vinyl groups of the formed hydroxy-terminated vinyl polyether polymer to form cyclic three-membered ethers (oxiranes) by the reaction of a peracid such as a perbenzoic acid with the olefinic double bonds of the vinyl groups, conventionally known as epoxidation. The vinyl polyether polymer is dissolved in a suitable solvent, such as chloroform (trichloromethane), and reacted with the peracid, such as a solution of meta-chloroperbenzoic acid in the same solvent, chloroform. The formed hydroxyl-terminated epoxy polyether polymer (HTEPE) in which x is a number greater than five is flowable, stable and rapidly cross-linkable by the addition of a primary, secondary or tertiary amine or phosphine curing agent of the type conventionally used for the curing of epoxy polymers.

Curing takes place rapidly, i.e., within about forth five minutes at normal ambient temperatures and more rapidly at more elevated temperatures, such as about five minutes at 60° C. The cured polymer is solid and non-tacky but remains flexible and crack-resistant and has excellent bonding properties within gaps and for surfaces to which it is applied.

It should be understood that the foregoing description is only illustrative of the invention. Various alternatives and modifications can be devised by those skilled in the art without departing from the scope of the present invention. Accordingly, the present invention is intended to embrace all such alternatives, modifications and variances which fall within the scope of the appended claims.

What is claimed is:

1. A liquid hydroxyl-terminated epoxy polyether polymer having the structure:

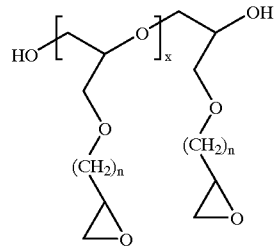

in which n is an integer between 1 and 10 and x is a number greater than about five.

2. A liquid polymer according to claim 1 in which n=1.

* * * * *